Figure 1:
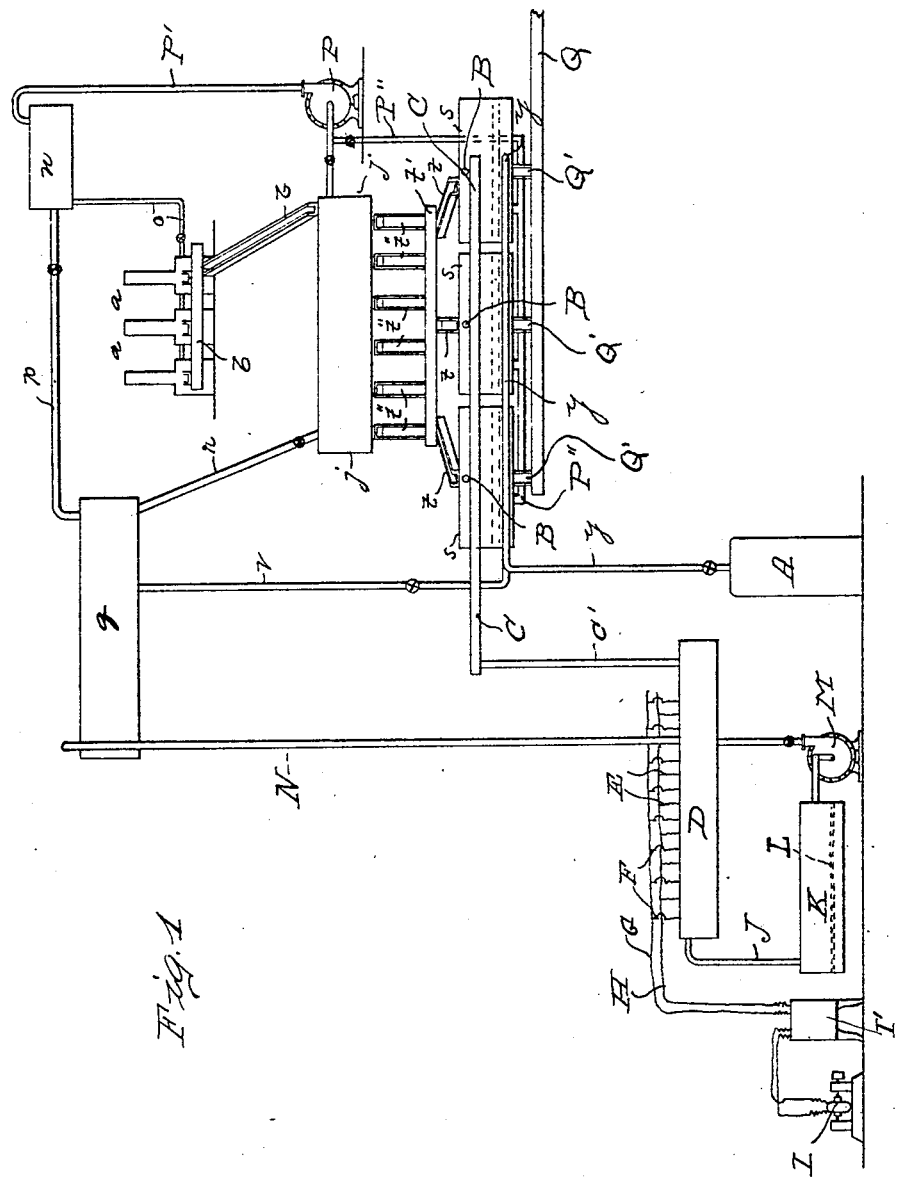

No. 813,620. PATENTED FEB. 27, 1906.
J. A. COMER.
PROCESS OF EXTRACTING GOLD, SILVER, &c.
APPLICATION FILED JAN. 2, 1904.

3 SHEETS—SHEET 1.

WITNESSES:
INVENTOR
Joseph A. Comer
BY
James R. Rogers
ATTORNEY

No. 813,620. PATENTED FEB. 27, 1906.
J. A. COMER.
PROCESS OF EXTRACTING GOLD, SILVER, &c.
APPLICATION FILED JAN. 2, 1904.

3 SHEETS—SHEET 2.

WITNESSES:

INVENTOR
Joseph A Comer
BY
James R Rogers
ATTORNEY

No. 813,620. PATENTED FEB. 27, 1906.
J. A. COMER.
PROCESS OF EXTRACTING GOLD, SILVER, &c.
APPLICATION FILED JAN. 2, 1904.
3 SHEETS—SHEET 3.
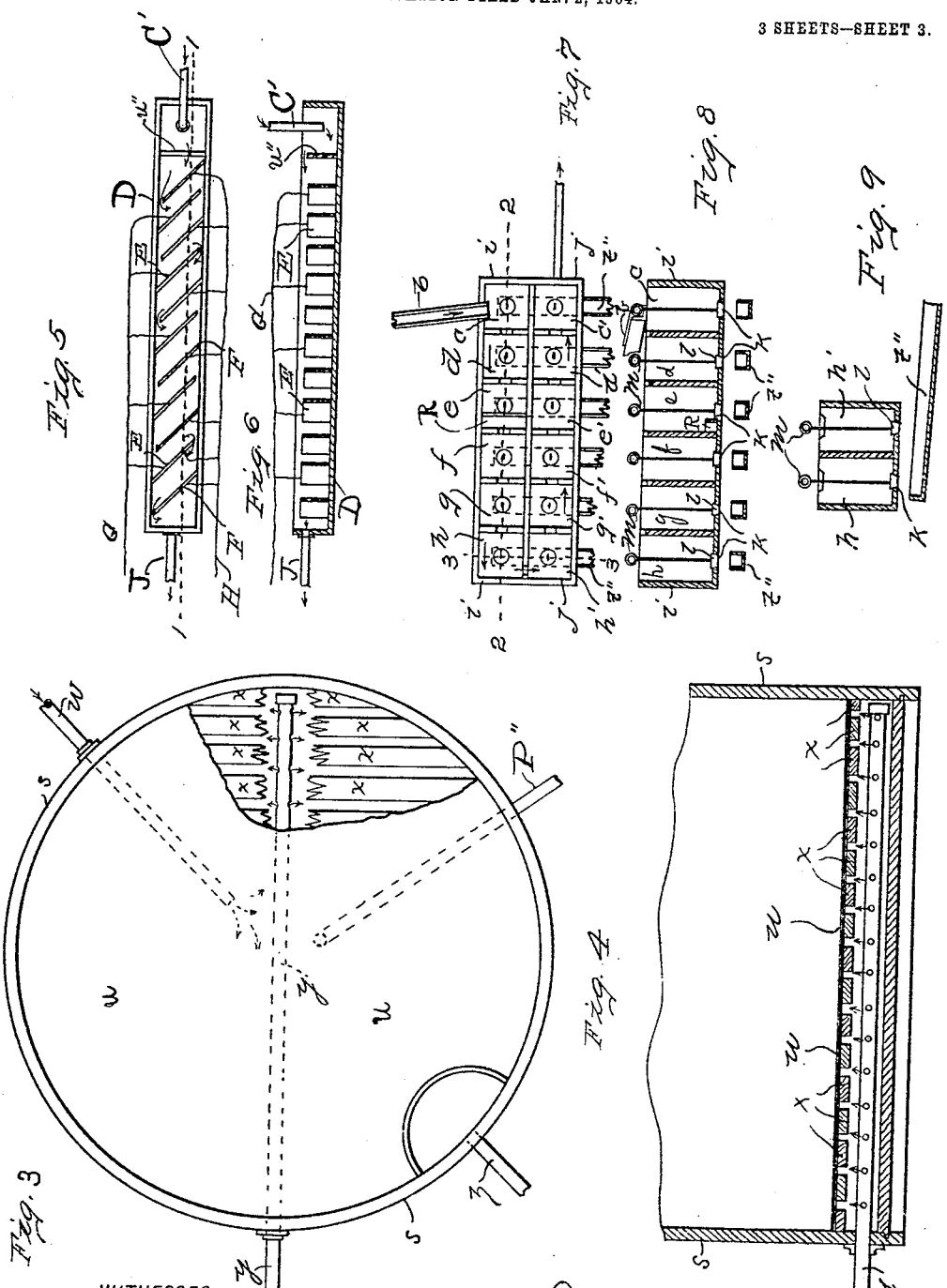

UNITED STATES PATENT OFFICE.

JOSEPH A. COMER, OF LOS ANGELES, CALIFORNIA.

PROCESS OF EXTRACTING GOLD, SILVER, &c.

No. 813,620.　　　　Specification of Letters Patent.　　　Patented Feb. 27, 1906.

Application filed January 2, 1904. Serial No. 187,578.

*To all whom it may concern:*

Be it known that I, JOSEPH A. COMER, a citizen of the United States, residing at Los Angeles, in the county of Los Angeles, State of California, have invented and discovered a new and useful process of extracting gold, silver, and other metals from ores by cyanid of potassium and precipitating the gold, silver, and other metals by electricity or zinc shavings; and I do hereby declare the following to be a full, clear, and exact description of the invention, such as will enable others skilled in the art to which it appertains to make and use the same.

This invention relates to improvements in a process for extracting gold, silver, and other metals with a solution of cyanid of potassium and precipitating the gold, silver, and other metals by electricity or zinc shavings; and the objects of my invention and discovery are, first, to dissolve the gold, silver, and other metals contained in the ores by a solution of the cyanid of potassium; second, to separate the pulp and sedimentary deposits from the said solution by running off or decanting the said cyanid solution holding the gold, silver, and other metals in solution; third, to separate the sediments suspended in the cyanid solution carrying in solution the gold, silver, and other metals dissolved out of the ores by means of compressed air; fourth, to filter the slime sediments in the metallic solution of the cyanid of potassium, render fluffy and flocculent by means of compressed air permeating the same, and, lastly, depositing the metallic gold, silver, and other metals dissolved in the clear filtered solution of the cyanid of potassium by electricity or zinc shavings.

In carrying out my invention and discovery, the process herein described, the apparatus herein described, and shown upon the drawings, I use for that purpose. I may use other apparatus for carrying out my said improved process, and do not, therefore, confine myself to the apparatus illustrated upon the drawings appended hereto.

I accomplished the several steps of my invention and discovery by construction and arrangement of the apparatus and the mechanism shown upon the accompanying drawings, in which—

Figure 2:
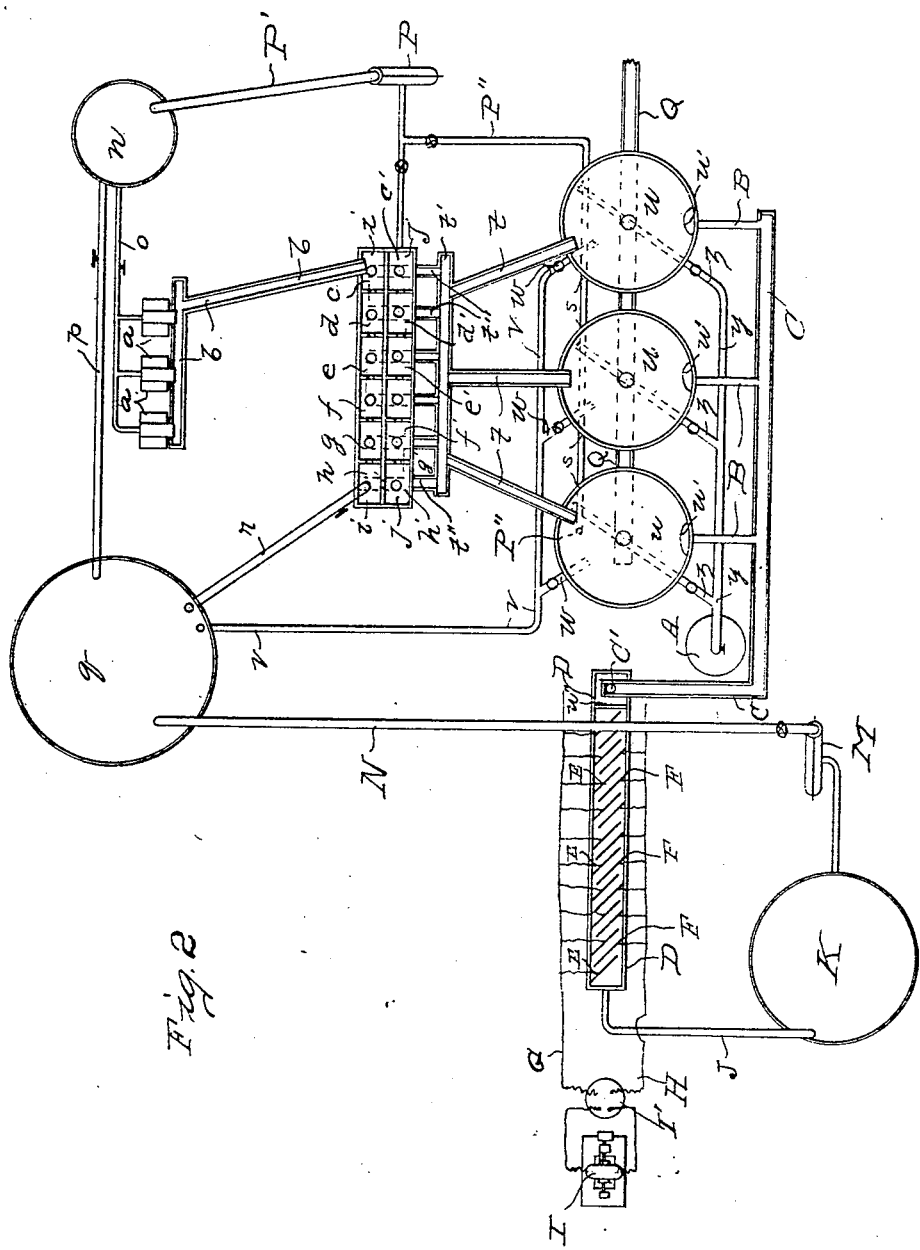

Figure 1 is a view in elevation of my improved apparatus. Fig. 2 is a plan view of the same. Fig. 3 is a plan view of one of the filtering-tanks, showing a portion of the filter and the slats supporting the same, located therein near the bottom, broken away and the solution and compressed-air pipes illustrated in full and dotted lines. Fig. 4 is a sectional view taken through one of the filtering-tanks, illustrating the filter, the supporting-slats in section, and the compressed-air pipe in elevation. Fig. 5 is a plan view of the electrolytic tank, showing the anode and cathode plates located therein, the wires connected thereto, and portions of the pipe for conveying the cyanid solution to and from the said tank. Fig. 6 is a longitudinal sectional view of the tank shown upon Fig. 5 of the drawings, taken on line 1 1 thereof. Fig. 7 is a plan view of the series of pulp-settling tanks, showing the open chutes or launders for conveying the pulp solution to and from the same and a pipe leading from one of the compartments thereof. Fig. 8 is a longitudinal sectional view taken on the line 2 2 of Fig. 7, and Fig. 9 is a cross-sectional view taken on the line 3 3 of Fig. 7.

Similar reference characters refer to like parts throughout the several views upon the drawings.

The reference-letter $a$ denotes the stamp-mill for crushing the ores.

$b$ refers to the chute or launder for conveying the crushed ores into the pulp-settling tanks $i$ and $j$, the first of which is subdivided into compartments $c$, $d$, $e$, $f$, $g$, and $h$, and the latter tank $j$ is subdivided into compartments $h'$, $g'$, $f'$, $e'$, $d'$, and $c'$. Each of said compartments is provided with an opening $k$, into which a plug $l$ is adapted to be secured, the said plug having a long handle $m$, extending above the upper edge of the said tanks $i$ and $j$ for removing the same.

The reference-letter R indicates the receptacle in which lime or other alkalies are deposited.

The reference-letter $n$ represents the weak-cyanid-solution tank. In this tank a weak solution of cyanid of potassium is always to be found.

The reference-letter P indicates the circulating-pump, and P' a pipe leading from the pump to the weak-cyanid-solution tank $n$.

From the tank $n$ the weak cyanid solution is conveyed by gravity through the pipe $o$ upon the ores while the same are being crushed by the stamp-mill $a$, and through the pipe $p$ the weak cyanid solution is conducted into the cyanid-of-potassium tank $q$. In this tank $q$ (hereinafter denominated the "cyanid-tank") a standard solution of the cyanid of potassium is kept in store ready for use. This standard solution of the cyanid of potassium in said tank $q$ will hereinafter be referred to as the "cyanid solution." By means of the pipe $r$, leading from the cyanid-tank $q$ into the compartment $h$ of the pulp-settling tank $i$, the said cyanid solution in said cyanid-tank is conveyed into said compartment $h$ of the tank $i$, where it is brought into contact with and intimately mixed with the crushed ore and the water passing through the stamp-mill $a$. The said crushed ore and water are also conveyed into the said pulp-settling tank $i$ by means of the chute or launder $b$.

The cyanid solution carrying the gold, silver, and other metals in solution and sedimentary deposits suspended therein are drawn off from the lower portions of the pulp in the pulp-settling tanks $i$ and $j$ and are conveyed over the upper edges and into a series of filtering-tanks $s$ $s$ by means of the open chutes or launders $t$ $t$. Said cyanid solution, with the gold, silver, and other metals in solution and sedimentary deposits suspended therein, falls upon the upper surfaces of the filter $u$ $u$, secured in the lower portions of the said filtering-tanks $s$ $s$. The pulp by means of the chutes or launders $t''$ $t''$ is conveyed from the lower portions of the settling-tanks $i$ and $j$, and the sedimentary deposits are washed out through the pipes $P''$ $P''$ from the filtering-tanks $s$ $s$ and conducted through the chutes or launders $Q'$ $Q'$ into the chute or launder $Q$ to a dump-heap for tailings hereinafter referred to. A supply of the standard cyanid solution in said cyanid-tank $q$ is now conveyed by means of the pipe $v$ and the branch pipes $w$ $w$ thereof into the said filtering-tanks $s$ $s$, near the lower portions thereof and under the filters $u$ $u$ and the supporting-slats $x$ $x$ therefor, where the said supply of the standard cyanid solution is intimately mixed with compressed air conveyed into the said filtering-tanks $s$ $s$ and under the said filters $u$ $u$ and under the supporting-slats $x$ $x$ by means of the pipe $y$ and the branch pipes $z$ $z$, connected to and leading from the air-compressor A. The said solution in the lower portions of the filtering-tanks $s$ $s$, thoroughly impregnated with the compressed air under the filters $u$ $u$, gently and in a quiescent state passes upward through the said filters and through the pulp and cyanid solution carrying the gold, silver, and other metals in solution and sedimentary deposits suspended therein from the pulp-settling tanks $i$ and $j$, permeates and thoroughly aerates the said solution and its sedimentary deposits, causes the latter to become fluffy and flocculent, being susceptible to the cyanid solution, thereby rendering the fluffy and flocculent deposits easily separated by means of the filters $u'$ $u'$, located near the upper edges of the filtering-tanks $s$ $s$ at the open ends of the outlet-pipes B B, leading into the open chute or launder C and the pipe $C'$ for conveying the twice-filtered aerated cyanid solution into the electrolytic tank D, provided at one end thereof, at which the said cyanid solution enters, carrying the gold, silver, and other metals in solution, free from sedimentary deposits, slimes, and other foreign matters. Through the filter $u''$ the said solution passes into the said electrolytic tank in order to be assured that all slimes and foreign matters have been abstracted therefrom before being brought in contact with the anode and cathode plates E and F, respectively, located within the said electrolytic tank D. To the anode-plate E and to the cathode-plate F wires G and H, respectively, are connected and lead to the electrogenerator I through the casing for the storage battery $I'$, containing convolutions of the said wires G and H, respectively, as shown upon Figs. 1 and 2. After all the gold, silver, and other metals have been deposited upon the said plates contained in the cyanid solution the said solution is conveyed, by means of the pipe J, into the sump-tank K, provided with a filter L near the lower portion thereof, under which filter a layer of lime is placed for further correcting the acidity of the cyanid solution, from which the said metals have been deposited, before returning the said solution by means of the pump M and the pipe N into the cyanid-tank $q$. The tailings from the pulp-settling tanks $i$ and $j$, after having passed through the same, the gold, silver, and other metals available therein having been extracted from them, the said tailings have thus been prepared by the cyanid-of-potassium treatment for a further treatment for extracting all the gold, silver, and other metals from the same, and I have discovered that these tailings are now in a better condition for subsequent treatment for obtaining tin from the same than the said tailings were originally before they were first brought in contact with the solution of cyanid of potassium.

It will readily appear from the foregoing description, when read in connection with the drawings hereto appended and made a part of the specification and claims, how the steps of the process herein are carried into effect, and further description of the manner of operating my improved apparatus to produce the steps of the improved process is deemed unnecessary.

Having described my invention and discovery, what I claim, and desire to secure by Letters Patent, is—

1. The process of extracting gold, silver, and other metals from ores, consisting in subjecting the crushed ores to a solution of the cyanid of potassium, drawing off the said solution from the pulp mixed therewith, impregnating with air the said solution and sedimentary deposits suspended therein, separating the sedimentary deposits from the solution, and depositing the metals contained in the solution with electricity.

2. The process of extracting gold, silver and other metals from ores, consisting in subjecting the ores to an alkaline solution of the cyanid of potassium, drawing off the said solution from the pulp mixed therewith, impregnating with air the said solution and sedimentary deposits suspended therein, separating the sedimentary deposits from the solution, and depositing the gold, silver and other metals in the said solution by means of electricity.

3. The process of extracting gold, silver and other metals from ores, consisting in dissolving the gold, silver and other metals from the ores by means of a cyanid solution, eliminating the pulp and other foreign matters suspended in said solution, forcing compressed air through the said cyanid solution and sedimentary deposits suspended therein, separating the said sedimentary deposits from the said solution, and depositing by means of electricity the metals carried in said solution.

4. The method of extracting metals from ores consisting in treating the crushed ores with an alkaline cyanid solution, separating the said solution from the ores and other foreign substances mixed therewith, injecting compressed air into said solution, separating sedimentary substances suspended in said solution, and depositing by means of electricity the metals dissolved by the said solution.

In testimony whereof I have signed my name to this specification in the presence of two subscribing witnesses.

JOSEPH A. COMER.

Witnesses:
 ANNA MORGAN,
 S. A. LAVENDER.